United States Patent [19]
Abrahams et al.

[11] 3,951,419
[45] Apr. 20, 1976

[54] SEAL BETWEEN MEMBERS WHICH ARE ROTATABLE RELATIVE TO EACH OTHER

[75] Inventors: Jacobus Hubertus Abrahams; Robertus Aloysius Tarcisius Walters, both of Eindhoven, Netherlands

[73] Assignee: U.S. Philips Corporation, New York, N.Y.

[22] Filed: June 11, 1975

[21] Appl. No.: 586,141

[30] Foreign Application Priority Data
June 18, 1974 Netherlands .................... 7408109

[52] U.S. Cl. .................................. 277/135
[51] Int. Cl.² ............................... F16J 15/40
[58] Field of Search ............... 277/135, 17–21, 277/27

[56] References Cited
UNITED STATES PATENTS

| | | |
|---|---|---|
| 1,050,219 | 1/1913 | Laughton .................. 277/21 |
| 1,528,721 | 3/1925 | Yeip ........................ 277/21 |
| 1,706,445 | 3/1929 | Forney ..................... 277/21 |
| 3,153,160 | 10/1964 | Carle ...................... 277/135 |
| 3,307,574 | 3/1967 | Anderson ................. 277/21 |

*Primary Examiner*—Robert I. Smith
*Attorney, Agent, or Firm*—Frank R. Trifari; J. David Dainow

[57] ABSTRACT

A seal assembly situated between two relatively rotatable members and axially separating a space of higher pressure from a space of lower pressure, the seal assembly including a fluid reservoir and a seal exposed to said high pressure and axially slidable to urge fluid from the reservoir into a sealing space when leakage occurs therefrom.

10 Claims, 1 Drawing Figure

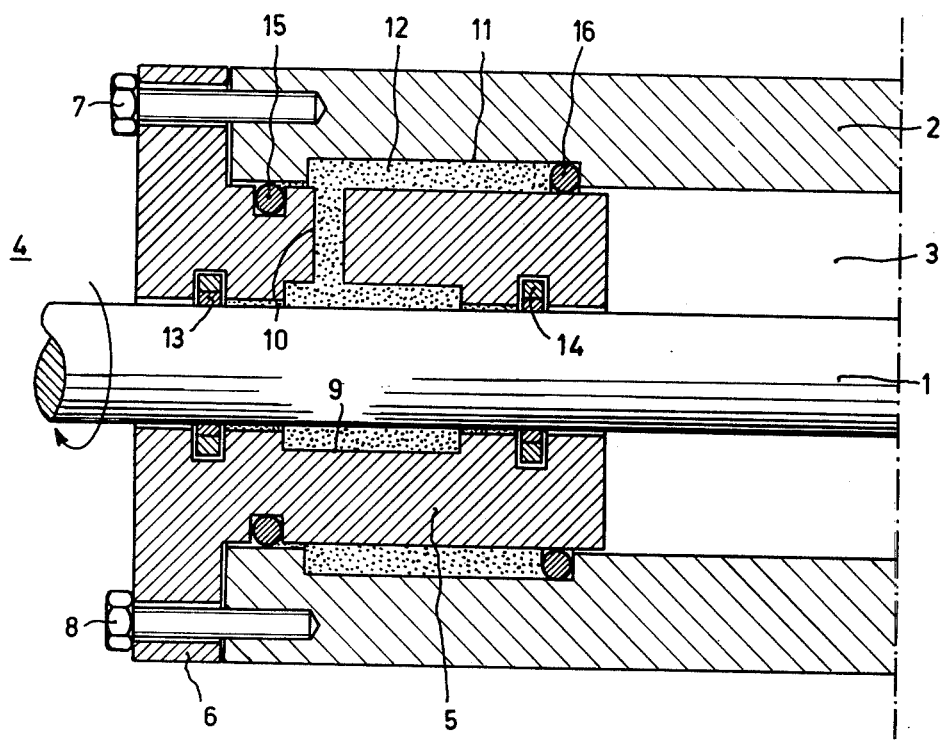

SEAL BETWEEN MEMBERS WHICH ARE ROTATABLE RELATIVE TO EACH OTHER

BACKGROUND OF THE INVENTION

The invention relates to a seal between an inner member and an enveloping outer member, such as a shaft and an enveloping housing, which are rotatable with respect to each other. The seal contains a viscous medium such as oil or grease which separates a space containing a gas of higher pressure from a space containing a gas of lower pressure. A seal of this kind can be used, for example, in hot-gas reciprocating engines in which the crank shaft is accommodated in a crank case containing gas under pressure (for example 100 atmospheres), the crank shaft being passed through a crank case wall to the surroundings where atmospheric pressure prevails.

SUMMARY OF THE INVENTION

The invention has for its object to provide a seal of the kind set forth which has a simple construction, which can be readily mounted and removed, which has a long service life and minimum gas leakage considering the large difference in the pressures prevailing on both sides, and which comprises an automatically operating mechanism for the internal replenishment of escaped oil or grease.

According to the invention, the seal comprises a sleeve which is arranged about the inner member and which is immobile with respect to the outer member; the said sleeve has an inner diameter over an intermediate portion of its length which is larger than the outer diameter of the inner member. An annular gas thus is formed which is in open communication, via at least one port through the sleeve, with an annular chamber which is bounded by the outer wall of the sleeve and the inner wall of the outer member. A viscous medium present in the chamber and the gap communicating therewith are separated from the spaces of higher pressure and lower pressure by means of sealing members between the sleeve and the outer member and the inner member, respectively. The sealing member on the side of the annular chamber which faces the space of higher pressure is arranged to be axially slidable in this chamber for the permanent transfer of the higher gas pressure to the viscous medium.

BRIEF DESCRIPTION OF THE DRAWING

The invention will be described in detail hereinafter with reference to the drawing which is not to scale and which is a diagrammatic longitudinal sectional view of a seal.

DETAILED DESCRIPTION OF THE PREFERRED EMBODIMENT

The reference 1 in the FIGURE denotes a shaft which is rotatable with respect to an enveloping housing 2. Between the shaft 1 and the housing 2 there is provided a seal which separates a space 3 containing a gas of higher pressure from the surroundings 4 of atmospheric pressure. The seal comprises a sleeve 5 with a flange 6 which is fitted about the shaft 1. The sleeve 5 is rigidly connected to the housing 2 by means of bolts 7 and 8 through the flange 6.

A central longitudinal portion of sleeve 5 has an inner diameter which is larger than the outer diameter of shaft 1. In this manner, an annular gap 9 is formed which is in open communication, via a duct 10 through the sleeve wall, with an annular chamber 11 between the outer wall of sleeve 5 and the inner wall of housing 2. In the present embodiment the annular chamber is provided by means of a recess in the wall of housing 2, but it will be understood that this chamber can also be formed by a recess in the wall of sleeve 5 or by a combination of both. Similar structural alternatives are also applicable to gap 9. Oil 12 is present in annular chamber 11, duct 10 and gap 9.

Sealing members 13 and 14 are present on both sides of gap 9 between the shaft 1 and the sleeve 5. Sealing members 15 and 16 are present between the sleeve 5 and the housing 2. Sealing member 16 is arranged to be axially slidable in the annular chamber 11. Via this sealing member 16, the oil 12 is continuously subject to the high-pressure prevailing in space 3. Consequently, the same high pressure prevails on both sides of the sealing member 14 between the rotating shaft 1 and the stationary sleeve 5. As a result, sealing member 14 is not loaded, which has a very favourable effect on both its service life and the sealing action.

Sealing member 13 separates the oil 12 under pressure from the surroundings at atmospheric pressure. Should any oil leak to the surroundings along this sealing member, the oil shortage arising in gap 9 is automatically replenished in that sealing member 16 moves towards flange 6 under the influence of the high gas pressure, thus causing displacement of oil from chamber 11 to gap 9 via duct 10.

What is claimed is:

1. A seal between an inner member and an enveloping outer member, such as a shaft and an enveloping housing, which are rotatable with respect to each other, the seal containing a viscous medium such as oil or grease which separates a space containing a gas of higher pressure from a space containing a gas of lower pressure, characterized in that the seal comprises a sleeve which is arranged about the inner member and which is immobile with respect to the outer member, the said sleeve having an inner diameter over an intermediate portion of its length which is larger than the outer diameter of the inner member, an annular gap thus being formed which is in open communication, via at least one port through the sleeve, with an annular chamber which is bounded by the outer wall of the sleeve and the inner wall of the outer member, a viscous medium present in the chamber and the gap communicating therewith being separated from the spaces of higher pressure and lower pressure by means of sealing members between the sleeve and the outer member and the inner member, respectively, the sealing member on the side of the annular chamber which faces the space of higher pressure being arranged to be axially slidable in this chamber for the permanent transfer of the higher gas pressure to the viscous medium.

2. In an assembly including a housing with a bore, a shaft extending through said bore and rotatable relative thereto, with an annular space defined between said bore and shaft, and first means for sealing said annular space and for axially separating spaces containing higher pressure and lower pressure fluids respectively, the improvement in combination therewith, wherein said first means comprises a sleeve situated in said annular space and fixedly secured to said housing, said sleeve having (a) an outer surface which defines with said housing bore an outer annular chamber, (b) an inner surface which defines with said shaft an annular gap, and (c) a duct interconnecting said chamber and gap, a viscous medium filling said chamber, gap, and duct, an inner seal situated between said shaft and sleeve's inner surface, said seal having opposite axial ends exposed to said medium in said gap and to said higher pressure fluids respectively, an outer seal situated between said housing bore and said sleeve's outer surface, said outer seal having opposite ends exposed to medium in said chamber and to said higher pressure fluid respectively, said outer seal being axially slidable in said chamber, whereby, upon leakage of said medium out of said gap, said higher pressure fluid will urge said outer seal to slide, thereby urging said medium to flow from said chamber via said duct into said gap for refilling same.

3. Apparatus according to claim 2, wherein said housing bore has a shoulder surface transverse of the bore axis, and wherein said sleeve has a radially extending flange corresponding to and fixedly engaging said shoulder.

4. Apparatus according to claim 2, wherein said viscous medium comprises oil.

5. Apparatus according to claim 2, further comprising a second outer seal between said housing bore and sleeve outer surface, said second outer seal axially spaced from the first outer seal with said chamber between and communicating with said outer seals.

6. Apparatus according to claim 2, further comprising a second inner seal between said shaft and sleeve inner surface, said second inner seal axially spaced from said first inner seal with said gas between and communicating with said inner seals.

7. Apparatus according to claim 2, wherein said chamber comprises an annular recess only in said housing bore, bounded by said sleeve outer surface.

8. Apparatus according to claim 2, wherein said chamber comprises an annular recess only in said sleeve outer surface, bounded by said housing bore.

9. Apparatus according to claim 2, wherein said gap comprises an annular gap only in said shaft, bounded by said sleeve inner surface.

10. Apparatus according to claim 2, wherein said gap comprises an annular recess only in said sleeve inner surface, bounded by said shaft.

* * * * *

UNITED STATES PATENT AND TRADEMARK OFFICE
CERTIFICATE OF CORRECTION

PATENT NO. : 3,951,419
DATED : April 20, 1976
INVENTOR(S) : JACOBUS HUBERTUS ABRAHAMS ET AL It is certified that error appears in the above-identified patent and that said Letters Patent are hereby corrected as shown below:

Col. 1, line 34, "gas" should be --gap--

Signed and Sealed this twenty-ninth Day of June 1976

[SEAL]

Attest:

RUTH C. MASON
*Attesting Officer*

C. MARSHALL DANN
*Commissioner of Patents and Trademarks*